(12) United States Patent
Golla et al.

(10) Patent No.: US 11,960,400 B2
(45) Date of Patent: Apr. 16, 2024

(54) MANAGING MULTIPLE CACHE MEMORY CIRCUIT OPERATIONS

(71) Applicant: Cadence Design Systems, Inc., San Jose, CA (US)

(72) Inventors: Robert T. Golla, Austin, TX (US); Matthew B. Smittle, Allen, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 47 days.

(21) Appl. No.: 17/660,775

(22) Filed: Apr. 26, 2022

(65) Prior Publication Data

US 2023/0342296 A1 Oct. 26, 2023

(51) Int. Cl.
*G06F 12/0811* (2016.01)

(52) U.S. Cl.
CPC ...... *G06F 12/0811* (2013.01); *G06F 2212/62* (2013.01)

(58) Field of Classification Search
CPC ............. G06F 12/0811; G06F 2212/62; G06F 12/0842; G06F 2212/621
USPC .................................................. 711/119, 154
See application file for complete search history.

(56) References Cited

U.S. PATENT DOCUMENTS

| 5,222,223 | A | 6/1993 | Webb, Jr. et al. | |
|---|---|---|---|---|
| 5,649,157 | A | 7/1997 | Williams | |
| 6,327,645 | B1 | 12/2001 | Hsiao et al. | |
| 6,496,906 | B1 | 12/2002 | Novak et al. | |
| 2002/0199063 | A1* | 12/2002 | Chaudhry | G06F 9/3834 711/122 |
| 2006/0004942 | A1* | 1/2006 | Hetherington | G06F 9/3867 711/3 |
| 2009/0006718 | A1* | 1/2009 | Blumrich | G06F 12/0804 711/E12.078 |
| 2011/0153942 | A1* | 6/2011 | Jain | G06F 12/0897 711/E12.024 |
| 2013/0311724 | A1* | 11/2013 | Walker | G06F 12/0811 711/E12.071 |
| 2014/0331013 | A1* | 11/2014 | Ishii | G06F 12/0806 711/145 |
| 2017/0371790 | A1* | 12/2017 | Dwiel | G06F 12/0862 |

* cited by examiner

*Primary Examiner* — Hashem Farrokh
(74) *Attorney, Agent, or Firm* — Mark H. Whittenberger; Holland & Knight LLP

(57) ABSTRACT

A cache memory circuit capable of dealing with multiple conflicting requests to a given cache line is disclosed. In response to receiving an acquire request for the given cache line from a particular lower-level cache memory circuit, the cache memory circuit sends probe requests regarding the given cache line to other lower-level cache memory circuits. In situations where a different lower-level cache memory circuit is simultaneously trying to evict the given cache line at the particular lower-level cache memory circuit is trying to obtain a copy of the cache line, the cache memory circuit performs a series of operations to service both requests and ensure that the particular lower-level cache memory circuit receives a copy of the given cache line that includes any changes in the evicted copy of the given cache line.

18 Claims, 7 Drawing Sheets

MANAGING MULTIPLE CACHE MEMORY CIRCUIT OPERATIONS

BACKGROUND

Technical Field

This disclosure relates to access to shared resources in a computer system, and, in particular, access to cache memory circuits.

Description of the Related Art

Computer systems include multiple processors or processor cores that may retrieve and execute program instructions from memory. The program instructions may be part of software programs or applications, and may be designed to perform particular functions, such as word processing, sending and receiving electronic mail, and the like. During execution of such a software program, instructions included in the software program may send data to, or receive data from, one or more devices included in, or coupled to, the computer system. Such data may also be stored and later retrieved from a memory circuit included in the computer system.

To facilitate the retrieval of program instructions, and the storage of data, computer systems may include multiple memory circuits. Such memory circuits may vary in storage capacity as well as access time. In some computer systems, memory circuits may be arranged in a hierarchical fashion, with smaller, faster memory circuits (referred to as "cache memories") coupled directly to processor circuits or processor cores. Larger, slower memory circuits (referred to as "main memory") are coupled to the processor circuits or processor cores via a memory management unit and a communication network.

Cache memories may store frequently used program instructions and data, so that a processor may quickly retrieve frequently used program instructions and data without having to wait for access to main memory. Accesses to main memory can take multiple processing cycles, which can cause a processor circuit or processor core to wait for requested data, resulting in a decrease in performance.

DETAILED DESCRIPTION

Figure 1:
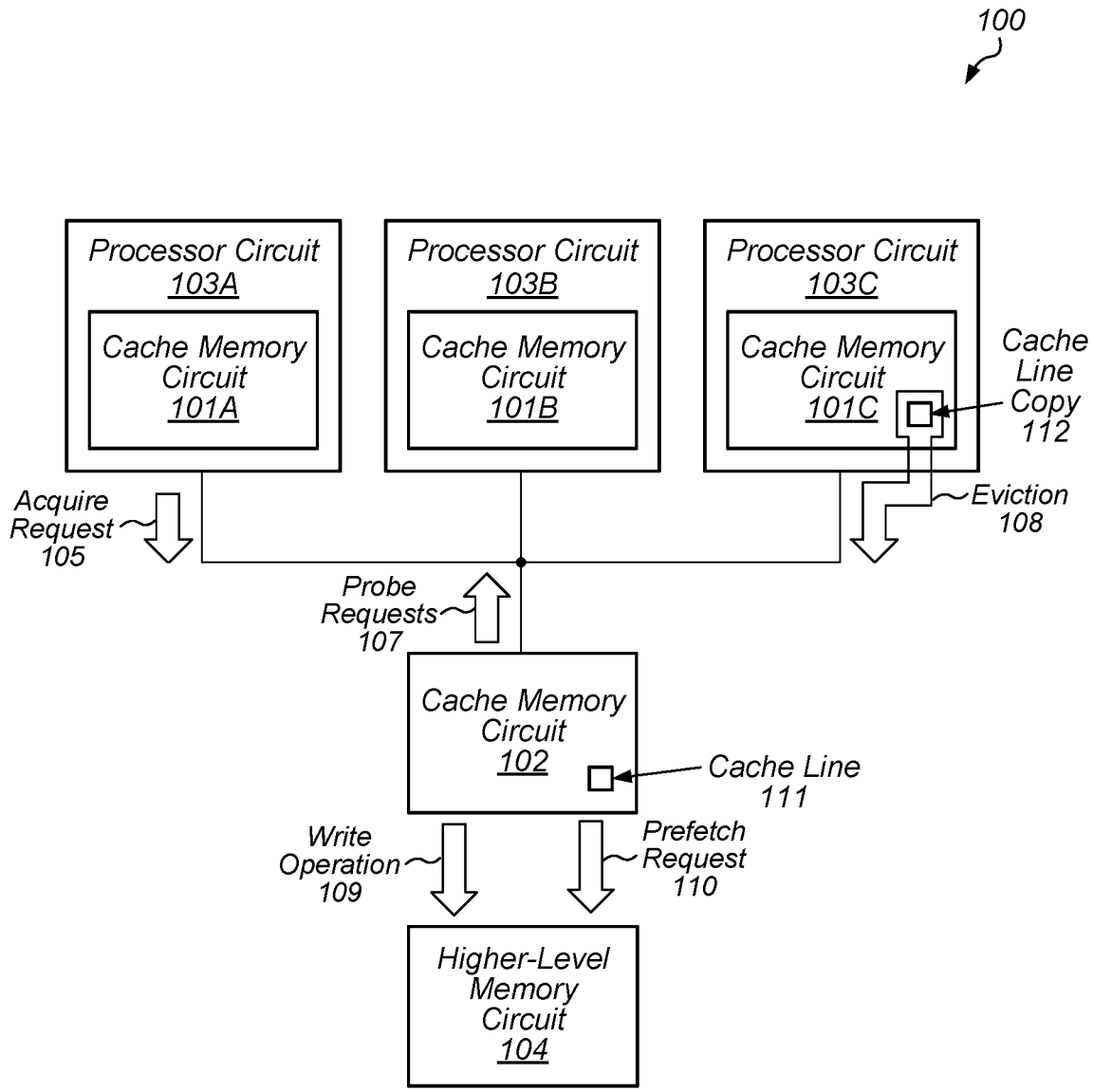
FIG. 1 is a block diagram of an embodiment of a cache memory subsystem of a computer system.

Computer systems often employ a hierarchy of memory circuits, with smaller-capacity, higher-performing memory circuits located in close proximity to processor circuits (or processor cores). During operation of a computer system, various memory circuits may store a variety of data relating to operands, instructions, graphics, or other audio and visual data.

One particular type of memory circuit employed in a computer system is a cache memory circuit, which is used to store frequently used program instructions and data for a processor circuit. By storing frequently used program instructions and data, a computer system can avoid delays associated with accesses to main memory or external storage devices, thereby improving performance. Stored information in a cache memory circuit is organized in "cache lines" that include multiple bits. In some cases, a cache line may store a single program instruction, an operand, or any other suitable type of data.

In some computer systems, multiple cache memory circuits may be employed. Small-capacity fast-access cache memory circuit may be included in a processor circuit or processor core to provide fast access to frequently used instructions and data within the processor circuit. In computer systems with multiple processor circuits, each of the multiple processor circuits can includes its own cache memory circuit(s). Given the limited storage capacity of cache memory circuits included in a processor circuit, occasionally an instruction or data needed by a given processor circuit may not be available within the given processor circuit's cache memory circuit. This situation is referred to as a "cache miss" and when it occurs, the given processor circuit's cache memory circuit issues a fetch for the request instruction or data to a next higher-level memory circuit. In some cases, the next higher-level memory may be another cache memory circuit, or it my be main or system memory for the computer system.

When a computer system employs multiple cache memory circuits at a same level of hierarchy, multiple copies of some cache lines may be stored in corresponding ones of the multiple cache memory circuits. During operation of the computer system, some copies of a given cache line may be modified. When this occurs, the modified (also referred to as "dirty") copies need to be stored to a next higher-level memory circuit and unmodified copies of the given cache line need to tagged as no longer containing current information. The process of tracking changes to copies of cache lines stored in different cache memory circuits is referred to as "cache coherency." Different protocols to maintain cache coherency, e.g., modified-owner-exclusive-shared-invalid (or "MOESI"), may be employed by different computer systems.

The different cache memory circuits in a computer system may communicate with each other using a communication protocol (e.g., TileLink) that allows sending a request from one cache memory circuit to another, and receiving a response to the request. In many computer systems, a higher-level cache memory circuit may manage the coherency for lower-level cache memory circuits coupled to it.

In some cases, the higher-level cache memory circuit can simultaneously receive multiple requests that can be in conflict with each other. For example, when a higher-level cache memory circuit receives a request for a copy for a particular cache line along with a notification of an eviction of a copy of the particular cache line from a lower-level cache memory, the request could be serviced prior to receiving the evicted copy of the particular cache line, resulting in a processor circuit using incorrect data. The embodiments illustrated in the drawings and described below provide techniques for a cache memory circuit to handle simultaneous requests and notifications, while still maintaining coherency to prevent incorrect data from being relayed to a processor circuit.

Turning now to FIG. 1, a block diagram of a cache memory subsystem is depicted. As illustrated, cache memory subsystem includes cache memory circuits 101A-101C, cache memory circuit 102, and higher-level memory circuit 104. Cache memory circuits 101A-101C are included in processor circuits 103A-103C, respectively. Although only three processor circuits with corresponding cache memory circuits are depicted in the embodiment of FIG. 1, in other embodiments, any suitable number of processor and cache memory circuits may be employed.

Cache memory circuits 101A-101C are configured to store respectively plurality of cache lines. In various embodiments, cache memory circuits 101A-101C may be implemented using static random-access memory (SRAM) circuits or any other suitable data storage circuits. Although processor circuits 103A-103C are depicted as each including a single cache memory circuit, in some embodiments, processor circuits 103A-103C can include multiple cache memory circuits, e.g., an instruction cache circuit and a data cache circuit, that are configured to store respectively pluralities of cache lines.

Cache memory circuit 102 is configured to send probe requests 107 to cache memory circuits 101B and 101C in response to receiving acquire request 105 from cache memory circuit 101A for access to cache line 111. In response to a determination that cache memory circuit 101C is performing eviction 108 on cache line copy 112, cache memory circuit 102 is configured to receive the cache line copy 112 from cache memory circuit 101C and write cache line copy 112 to higher-level memory circuit 104 via write operation 109.

As used and defined herein, an acquire request is a request from one cache memory circuit to another cache memory circuit to obtain a copy of given cache line. In some cases, an acquire request may include request to write (or "update") the requested cache line. A probe request, as defined herein, is a request sent from one cache memory circuit to another cache memory circuit for whether or not the other cache memory circuit is storing a copy of a particular cache line. In some cases, a probe request may also include a request for information (e.g., coherency information) from the other cache memory circuit should the other cache memory circuit be storing a copy of the particular cache line.

Cache memory circuit 102 is further configured to send prefetch request 110 for a new copy of cache line 111 while cache memory circuit 101C response to a corresponding one of probe requests 107. In other embodiments, cache memory circuit 102 is also configured to relay the new copy of cache line 111 to cache memory circuit 101A in response to acquire request 105.

In response to receiving a corresponding one of probe requests 107, a given cache memory circuit of cache memory circuits 101A-101C are configured, in response to a determination that a copy of cache line 111 is being stored in the given cache memory circuit, invalidate the copy of cache line 111. The given cache memory circuit is also configured, in response to a determination that the copy of the cache line 111 has been updated since it was originally stored in the given cache memory circuit, to send the copy of cache line 111 to cache memory circuit 102.

As described below, cache memory circuit 102 may include multiple banks and is configured to route received requests (e.g., acquire request 105) to different banks. The multiple banks can include multiple pipeline stages with various queues configured to control the transfer of operations related to received requests from one pipeline stage to another.

Figure 2:
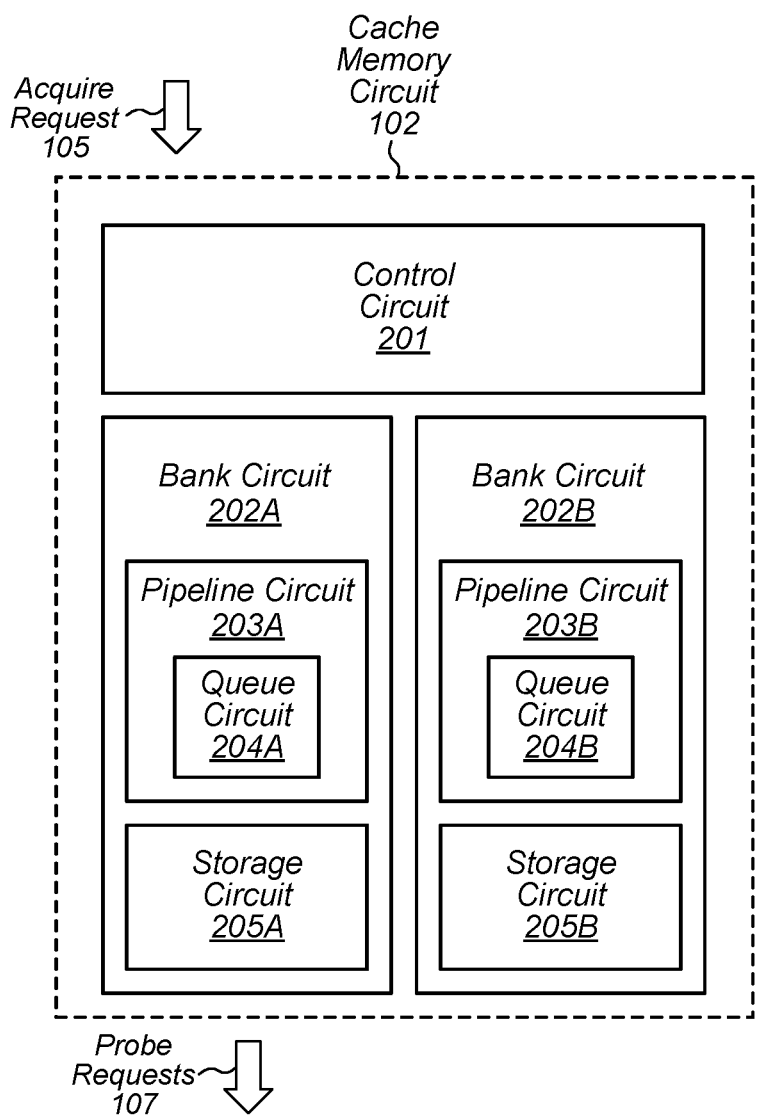
FIG. 2 is a block diagram of an embodiment of a multi-bank cache memory circuit.

Turning to FIG. 2, a block diagram of cache memory circuit 102 is depicted. As illustrated, cache memory circuit 102 includes control circuit 201, bank circuit 202A, and bank circuit 202B. It is noted that although only two bank circuits are depicted in cache memory circuit 102, in other embodiments, cache memory circuit 102 may include any suitable number of bank circuits.

Control circuit 201 is configured to receive acquire request 105 and send probe requests 107. Control circuit 201 may be configured to route different acquire requests (e.g., acquire request 105) to either bank circuit 202A or bank circuit 202B based on address information included in the acquire requests or any other suitable information.

Bank circuit 202A includes pipeline circuit 203A and storage circuit 205A. In a similar fashion, bank circuit 202B includes pipeline circuit 203B and storage circuit 205B. Pipeline circuit 203A includes queue circuit 204A, and pipeline circuit 203B includes queue circuit 204B.

Pipeline circuit 203A is configured to process requests routed to bank circuit 202A by control circuit 201. In a similar fashion, pipeline circuit 203B is configured to process requests routed to bank circuit 202B by control circuit 201. In various embodiments, pipeline circuits 203A and 203B may include respective stages of logic circuits configured to perform respective operations. The stages are connected in series, where the output of one stage is the input of the next stage. In some embodiments, the stages of pipeline circuits 203A and 203B can be configured to operate in parallel or in time-sliced fashion. In some embodiments, buffer circuits may be inserted between the different stages within pipeline circuits 203A and 203B.

Queue circuit 204A is included in one stage of pipeline circuit 203A, and queue circuit 204B is included in one stage of pipeline circuit 203B. In various embodiments, queue circuit 604A is configured to manage access to an initial pipeline stage in pipeline circuit 203A, and queue circuit 204B is configured to manage access to an initial pipeline stage in pipeline circuit 203B. Although pipeline circuit 203A and pipeline circuit 203B are depicted as each included a single queue circuit, in other embodiments, both pipeline circuits 203A and 203B can include multiple queue circuits configured to manage access to corresponding pipeline stages within pipeline circuits 203A and 203B.

Storage circuits 205A and 205B may, in various embodiments, be implemented using multiple SRAM storage cell circuits. In some cases, storage circuits 205A and 205B may each include multiple ports, for example, each of storage circuits 205A and 205B may include a read port and a write port. In such cases, storage circuits 205A and 205B may be implemented using multiple multi-port storage cell circuits.

Figure 3:
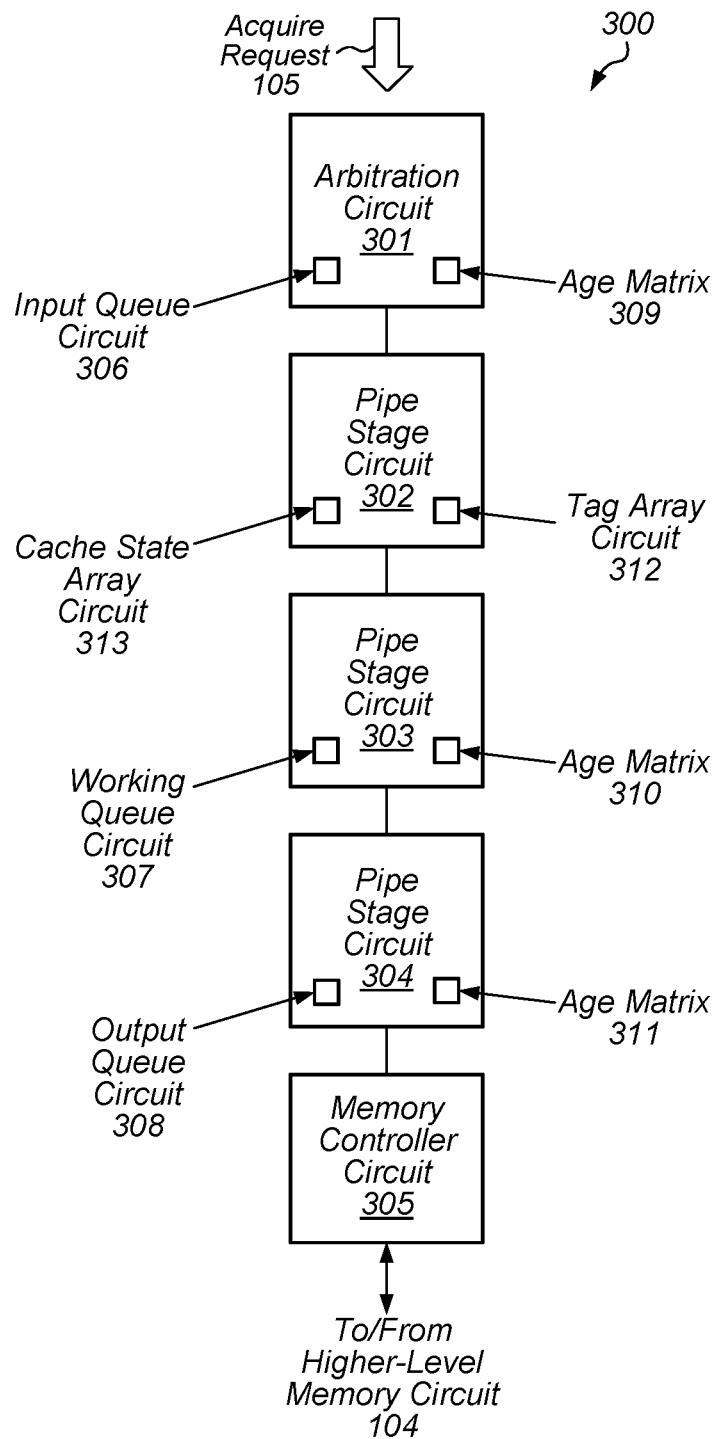
FIG. 3 is a block diagram of an embodiment of a bank circuit included in a cache memory circuit.

Turning to FIG. 3, a block diagram of an embodiment of bank circuit included in a cache memory circuit is depicted. As illustrated, bank circuit 300 includes arbitration circuit 301, pipe stage circuits 302-304, and memory controller circuit 305. In various embodiments, bank circuit 300 may correspond to either of bank circuits 202A or 202B.

Arbitration circuit 301 is configured to receive acquire request 105 and store it in input queue circuit 306. In various embodiments, arbitration circuit 301 may be further configured to arbitrate between different received requests for access to shared busses and other shared resources within bank circuit 300. Arbitration circuit 301 may, in some embodiments, be configured to arbitrate access to the shared busses and other shared resources, based on age, priority, or other suitable quality-of-service metric associated with the received requests.

Input queue circuit 306 may be configured to function as an out-of-order queue circuit that selects a given one of previously stored requests based on age information included in age matrix 309. In some cases, the request stored in input queue circuit 306 correspond to read/write requests for a bank's storage circuit (e.g., storage circuit 205A). In various embodiments, a given entry included in input queue circuit 306 may include data indicative of whether or not the entry is valid, status of whether the entry has been picked and is eligible for replay, age information, permission, source of the request, address information, and the like.

Age matrix 309 is configured to store age information for requests stored in input queue circuit 306. In various embodiments, the age information may include data indicative of the relative durations that multiple requests have been stored in input queue circuit 306. Age matrix 309 may, in some embodiments, be configured to update the age information in response to a new request being added to input queue circuit 306, and in response to a request previously stored in input queue circuit 306 being transferred to pipe stage circuit 302. In various embodiments, age matrix 309 may be implemented as a register file or other suitable data storage circuit.

In various embodiments, arbitration circuit 301 may be implemented using a state machine or other suitable sequential logic circuit. In some embodiments, input queue circuit 306 and age matrix 309 may be implemented using multiple latch circuits, register circuits, flip-flop circuits, or any other suitable storage circuit.

Pipe stage circuit 302 is configured to access tag array circuit 312 using requests received from input queue circuit 306. Tags retrieved from tag array circuit 312 can be used in a different pipe stage at access a bank's storage circuit (e.g., storage circuit 205A). Additionally, pipe stage circuit 302 is also configured to access cache state array circuit 313, which is configured to store a cache state for cache lines stored in a bank's data storage circuit (e.g., storage circuit 205A). In various embodiments, the cache state information for a given cache line may include information indicative of the validity of a given cache line, whether or not the given cache line has been used, and the like.

In various embodiments, pipe stage circuit 302 may more than one tag array circuit and more than one cache state array circuit. Both tag array circuit 312 and cache state array circuit 313 may be implemented using SRAM circuits or other suitable data storage circuits. In some embodiments, pipe stage circuit 302 may be implemented using any suitable combination of sequential and combinatorial logic circuits.

Pipe stage circuit 303 is configured to perform read operations on a bank's data storage circuit. In various embodiments, tag information retrieved by pipe stage circuit 302 may be used to the bank's data storage circuit. Pipe stage circuit 303 includes working queue circuit 307 and age matrix 310. In various embodiments, working queue circuit 307 is configured to manage out-of-pipe operations for a given bank. In some cases, operations stored in working queue circuit 307 are scheduled to be performed based on age information stored in age matrix 310 and results from pending requests made to other cache memory circuits (e.g., probe requests).

In some embodiments, pipe stage circuit 303 may be implemented using any suitable combination of sequential and combinatorial logic circuits. Working queue circuit 307 and age matrix 310 may be implemented using a register file or any other suitable data storage circuit.

Pipe stage circuit 304 is configured to process operations queued in output queue circuit 308. For example, pipe stage circuit 304 is configured to send messages and requests to cache memory circuits 101A-101C. Additionally, pipe stage circuit 304 is further configured to send memory operations to memory controller circuit 305. In various embodiments, the operations are performed based on age information stored in age matrix 311.

In some embodiments, pipe stage circuit 304 may be implemented using any suitable combination of sequential and combinatorial logic circuits. Output queue circuit 308 and age matrix 311 may be implemented using a register file or any other suitable data storage circuit.

Memory controller circuit 305 is configured to send requests to and receive information from higher-level memory circuit 104. In some embodiments, memory controller circuit 305 processes read requests and write requests in the order in which they are received from output queue circuit 308. Memory controller circuit 305 is configured, in some embodiments, to track multiple outstanding requests to memory controller circuit 305. In various embodiments, memory controller circuit 305 may be implemented using a microcontroller, a state machine, or any other suitable combination of sequential and combinatorial logic circuits.

Figure 4:
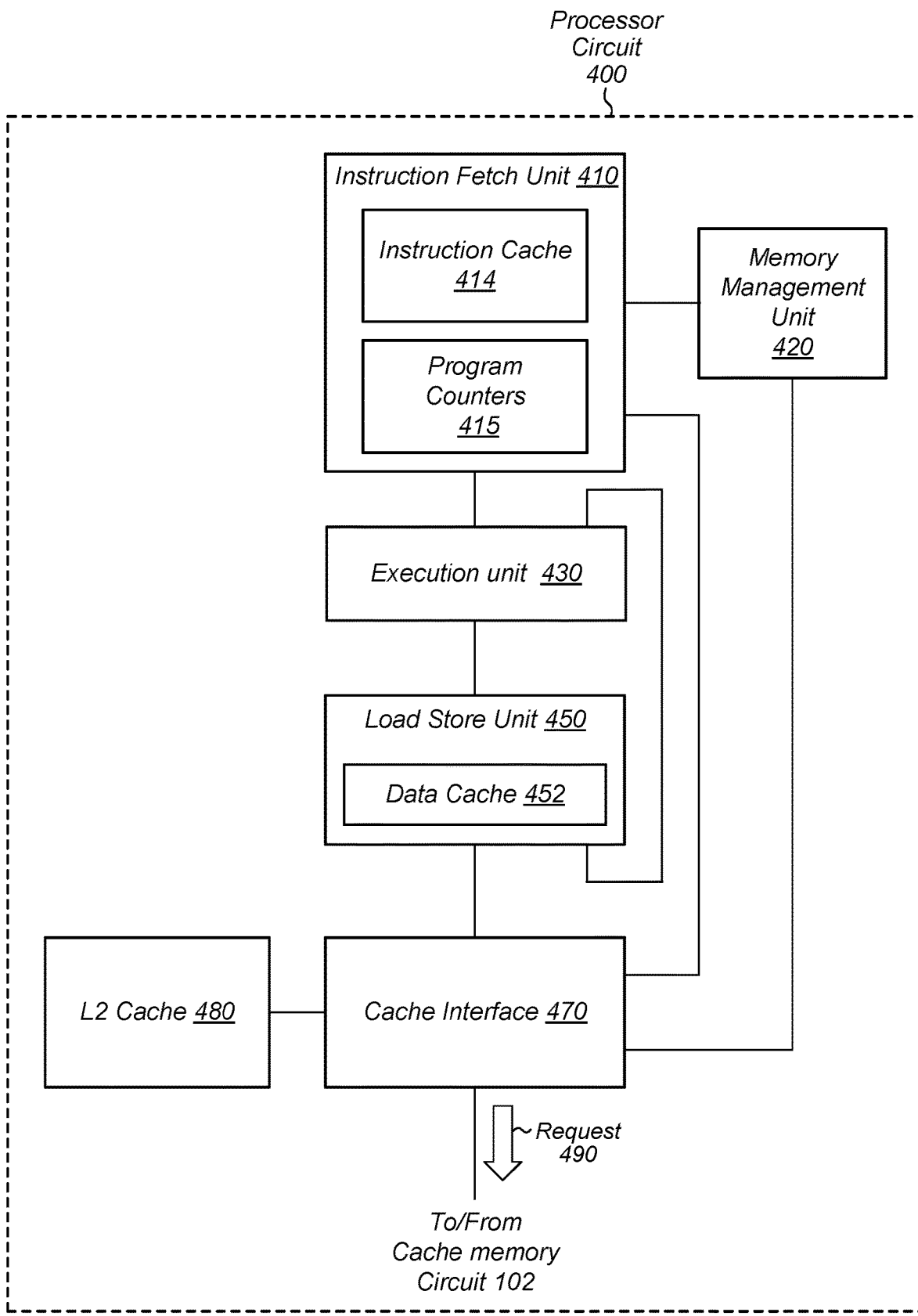
FIG. 4 is a block diagram of an embodiment of a processor circuit.

Turning to FIG. 4, a block diagram of an embodiment of a processor circuit is depicted. As illustrated, processor circuit 400 includes instruction fetch unit 410, memory management unit 420, execution unit 430, load store unit 450, cache interface 470, and L2 cache 480. In various embodiments, processor circuit 400 may correspond to any of processor circuits 103A-103C as depicted in FIG. 1.

Instruction fetch unit 410 is coupled to memory management unit 420 and cache interface 470. In various embodiments, instruction fetch unit 410 is configured to perform various operations relating to the fetching of instructions from a cache or memory circuit, the selection of instructions from various threads of execution, and the decoding of such instructions prior to issuing the instructions to various functional units for execution. As illustrated, instruction fetch unit 410 includes instruction cache 414 and program counters 415.

In some embodiments, program counters 415 is configured to generate multiple values corresponding to addresses of instructions to be fetched for respective threads being executed by processor circuit 400. Program counters 415 may be implemented using one or more sequential logic circuits configured to generate such address values.

Memory management unit 420 is configured to relay requests and responses from instruction fetch unit 410 and cache interface 470 to and from system memory. In various embodiments, memory management unit 420 may be further configured to perform address translation from a virtual address space used by processor circuit 400 to a physical address space used by system memory. Memory management unit 420 may, in other embodiments, be configured to translate requests from an internal format used within processor circuit 400 to a format compatible with system memory. In a similar fashion, memory management unit 420 may be further configured to translate replies from system memory into a format compatible with processor circuit 400. In various embodiments, memory management unit 420 may be implemented using a state machine or other sequential logic circuit, a microcontroller, or any other suitable logic circuit.

Execution unit 430 is configured to execute and provide results for certain types of instructions issued from instruction fetch unit 410. In some embodiments, execution unit 430 may be configured to execute certain integer-type instructions defined in the implemented instruction set architecture. It is noted that although only a single execution unit is depicted in the embodiment of FIG. 4, in other embodiments, multiple execution units may be employed.

Load store unit 450 is configured to process data memory references, such as integer and floating-point load and store instructions. In some embodiments, load store unit 450 may be further configured to assist in the processing of instruction cache 414 misses originating from instruction fetch unit 410. As illustrated, load store unit 450 includes data cache 452 in addition to a logic circuit configured to detect cache misses and, in response to such misses, request data from L2 cache 480 or a higher-level cache memory via cache interface 470.

In various embodiments, data cache 452 may be implemented as a write-through cache, in which all writes (or "stores") to data cache 452 are written to a higher-level cache memory regardless of whether the stores hit in data cache 452. In some cases, writes that miss in data cache 452 can result in an allocation within data cache 452 that can be used for storing the data.

L2 cache 480 is configured to store (or "cache") frequently used instructions and data for use by execution unit 430. In various embodiments, L2 cache 480 may be implemented using multiple banks that can be independently accessed using corresponding addresses. Such banks may be implemented using set-associative or direct-mapped techniques.

Cache interface 470 is configured to relay requests (e.g., request 490) from data cache 452 and L2 cache 480 to cache memory circuit 102. In response to a determination that requested data is unavailable from the cache memory circuit 102, cache interface 470 may relay the data request to memory management unit 420 for transmission to system memory or other storage. Cache interface 470 may, in various embodiments, be implemented using a state machine or other sequential logic circuit, a microcontroller, or any other suitable logic circuit.

To summarize, various embodiments, of a cache memory subsystem are disclosed. Broadly speaking, an apparatus is contemplated in which a plurality of first-level cache memory circuits are configured to store respective pluralities of cache lines. A second-level cache memory circuit is configured to send a plurality of probe requests regarding a particular cache line to the plurality of first-level cache memory circuits in response to receiving an acquire request for the particular cache line from a particular first-level cache memory circuit of the plurality of first-level cache memory circuits. In response to a determination that a different first-level cache memory circuit of the plurality of first-level cache memory circuits is evicting a local copy of the particular cache line, the second-level cache memory circuit is configured to receive the local copy of the particular cache line from the different first-level cache memory circuit, write the local copy of the particular cache line to a higher-level memory circuit, and send a prefetch request for a new copy of the particular cache line to the higher-level memory while the different processor circuit responds to a corresponding one of the plurality of probe requests. In some cases, the acquire request includes a write request for the particular cache line.

In some embodiments, the second-level cache memory circuit is further configured to relay the new copy of the particular cache line to the particular first-level cache memory circuit in response to the acquire request. In other embodiments, a given first-level cache memory circuit of the plurality of first-level cache memory circuits is configured, in response to receiving a corresponding one of the plurality of probe requests, to, in response to a determination that a copy of particular cache line is being stored in the given first-level cache memory circuit, invalidate the copy of the particular cache line, and in response to a determination that the copy of the particular cache line has been updated since it was originally stored in given first-level cache memory circuit, send the copy of the particular cache line to the second-level cache memory circuit.

In various embodiments, the second-level cache memory circuit includes a control circuit, and a plurality of banks. The control circuit is configured to select a particular bank of the plurality of banks, and route the acquire request to the particular bank. In other embodiments, the particular bank includes an input queue circuit, a storage circuit, and a plurality of pipeline stages configured to perform corresponding operation. The second-level cache memory circuit may be further configured to transfer the acquire request from the input queue circuit to an initial pipeline stage of the plurality of pipeline stages based on a length of time since the acquire request was received.

Figure 5:
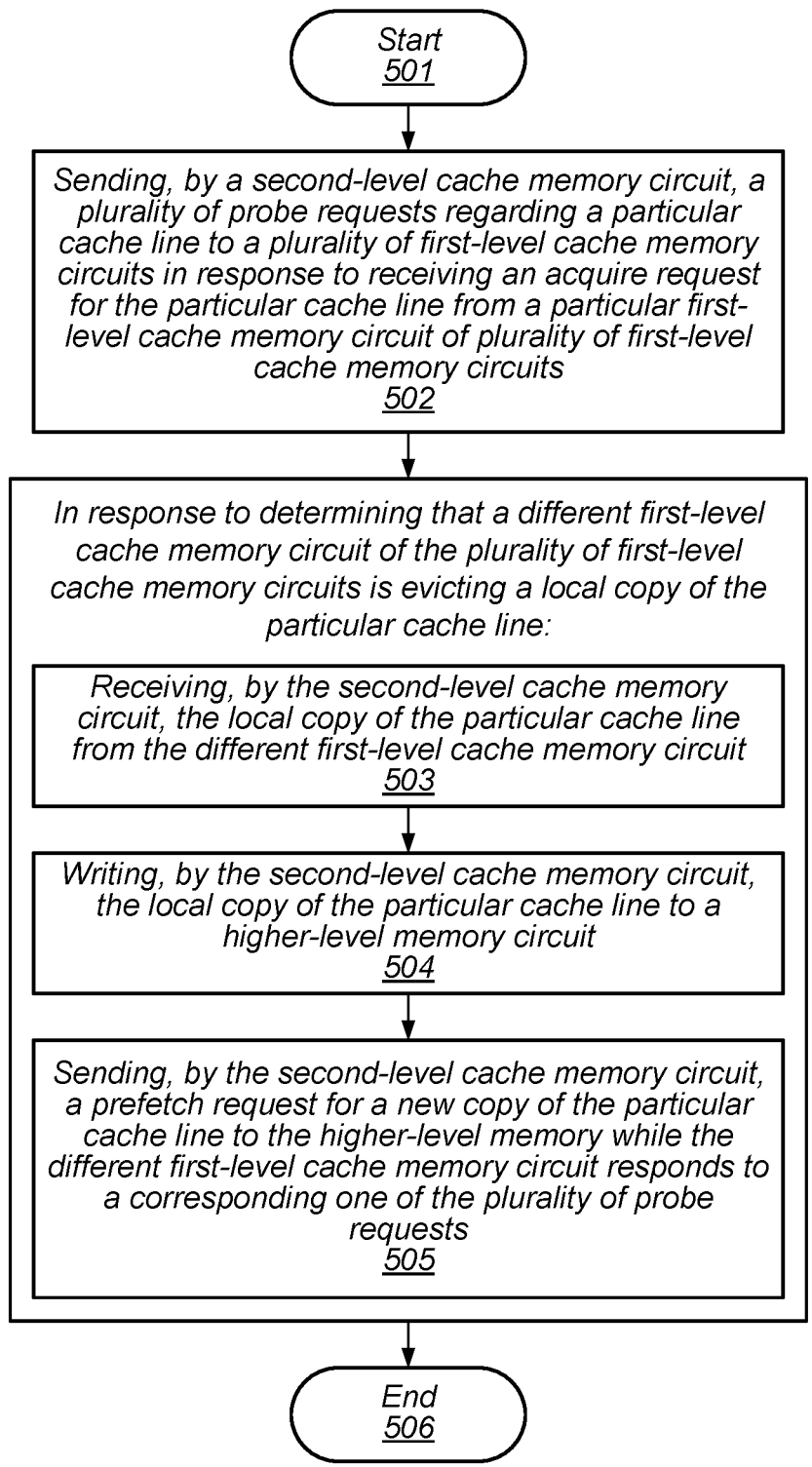
FIG. 5 is a flow diagram of an embodiment of a method for servicing an acquire operation and an eviction operation to a common cache line in a cache memory circuit.

Turning to FIG. 5, a flow diagram depicting an embodiment of a method servicing an acquire operation and an eviction operation to a common cache line in a cache memory circuit. The method, which may be applied various memory subsystems, e.g., cache memory subsystem 100, begins in block 501.

The method includes sending, by a second-level cache memory circuit, a plurality of probe requests regarding a particular cache line to a plurality of first-level cache memory circuits in response to receiving an acquire request from a particular first-level cache memory of the plurality of cache memory circuits (block 502). In some embodiments, the acquire request includes a write request for the particular cache line.

The method further includes, in response to determining that a different first-level cache memory circuit of the plurality of first-level cache memory circuits is evicting a local copy of the particular cache line, receiving, by the second-level cache memory circuit, the local copy of the particular cache line from the different first-level cache memory circuit (block 503).

In various embodiments, the method also includes, in response to determining, by a given first-level cache memory circuit of the plurality of first-level cache memory circuits, that a copy of particular cache line is being stored in the given first-level cache memory circuit, invalidating the copy of the particular cache line in response to receiving a given one of the plurality of probe requests. In other embodiments, the method further includes, in response to determining by a given first-level cache memory circuit of the plurality of first-level cache memory circuits, that a copy of the particular cache line being stored in the given first-level cache memory circuit has been updated since it was originally stored in the given first-level cache memory circuit, sending the copy of the particular cache line to the second-level cache memory circuit.

The method also includes, in to response to determining that the different first-level cache memory circuit of the plurality of first-level cache memory circuits is evicting the local copy of the particular cache line, writing, by the second-level cache memory circuit, the local copy of the particular cache line to a higher-level memory circuit (block 504).

The method further includes, in to response to determining that the different first-level cache memory circuit of the plurality of first-level cache memory circuits is evicting the local copy of the particular cache line, sending, by the second-level cache memory circuit, a prefetch request for a new copy of the particular cache line to the higher-level memory while the different first-level cache memory circuit responds to a corresponding one of the plurality of probe requests (block 505). In various embodiments, the method may also include relaying, by the second-level cache memory circuit, the new copy of the particular cache line to the particular first-level cache memory circuit in required to the acquire request. The method concludes in block 506.

Figure 6:
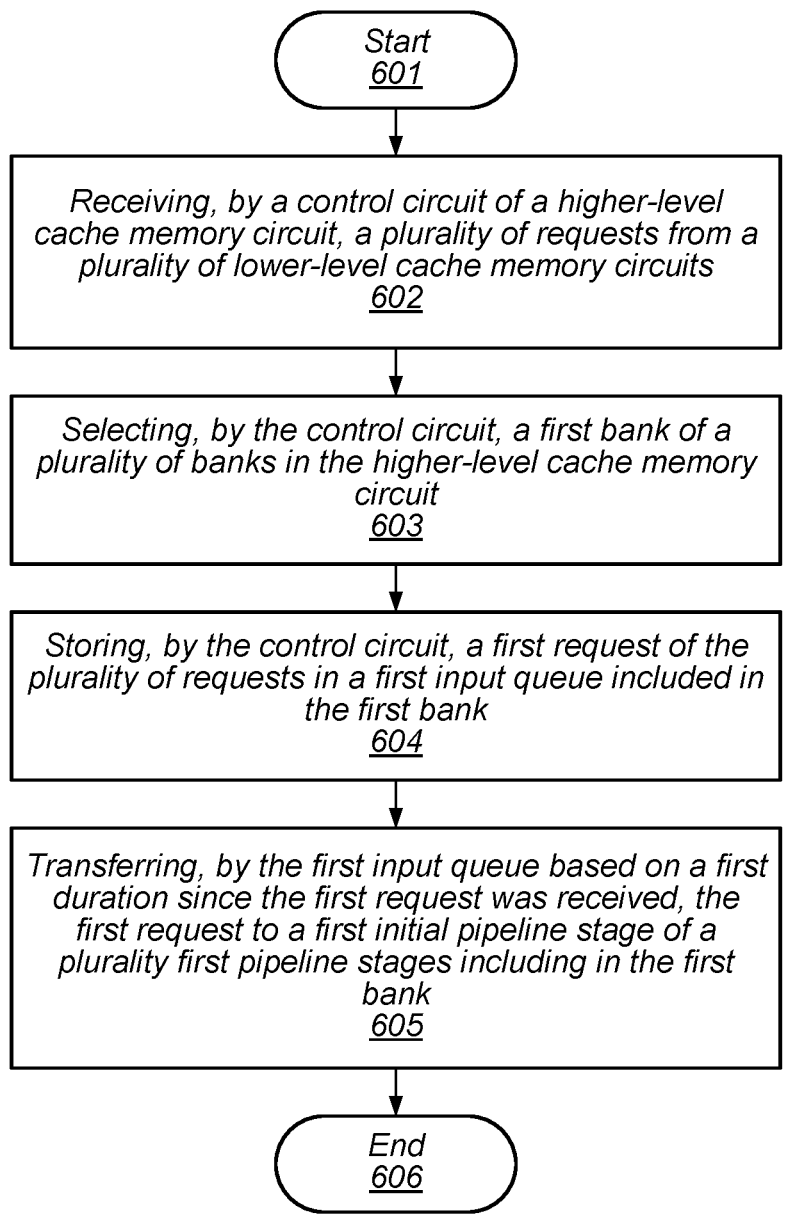
FIG. 6 is a flow diagram of an embodiment of a method for arbitrating access to a cache memory circuit in a computer system.

Turning to FIG. 6, a flow diagram depicting an embodiment of a method for arbitrating access to a cache memory circuit is illustrated. The method, which may be applied to various cache memory circuit, e.g., cache memory circuit 102, begins in block 601. It is noted that all or portions of the method depicted in the flow diagram of FIG. 6 may be used in conjunction with the method depicted in the flow diagram of FIG. 5.

The method includes receiving, by a control circuit of a higher-level cache memory circuit, a plurality of requests from a plurality of lower-level cache memory circuits (block 602). In various embodiments, the higher-level cache memory circuit may include multiple bank, each including respective input queues, pluralities of pipeline stages, and storage circuits.

The method further includes selecting, by the control circuit, a first bank of a plurality of banks in the higher-level cache memory circuit (block 603). In various embodiments, selecting the first bank may include selecting the first bank according a round robin algorithm. In other embodiments, selecting the first bank may include selecting the first bank based on corresponding numbers of pending requests for the each bank of the plurality of banks.

The method also includes storing, by the control circuit, a first request of the plurality of requests in a first input queue included in the first bank (block 604). In other embodiments, the method may further include selecting, by the control circuit, a second bank of the plurality of banks, and storing a second request of the plurality of requests in a second input queue included in the second bank. In various embodiments, either the first request or the second request may include an acquire request for a particular cache line store in storage circuits of the higher-level cache memory circuit.

The method further includes transferring, by the first input queue based on a first duration since the first request was received, the first request to a first initial pipeline stage of a plurality of first pipeline stages included in the first bank (block 605). In some embodiments, the method also includes generating, based on the first request, a plurality of probe requests for the plurality of lower-level cache memory circuits. The method concludes in block 606.

Figure 7:
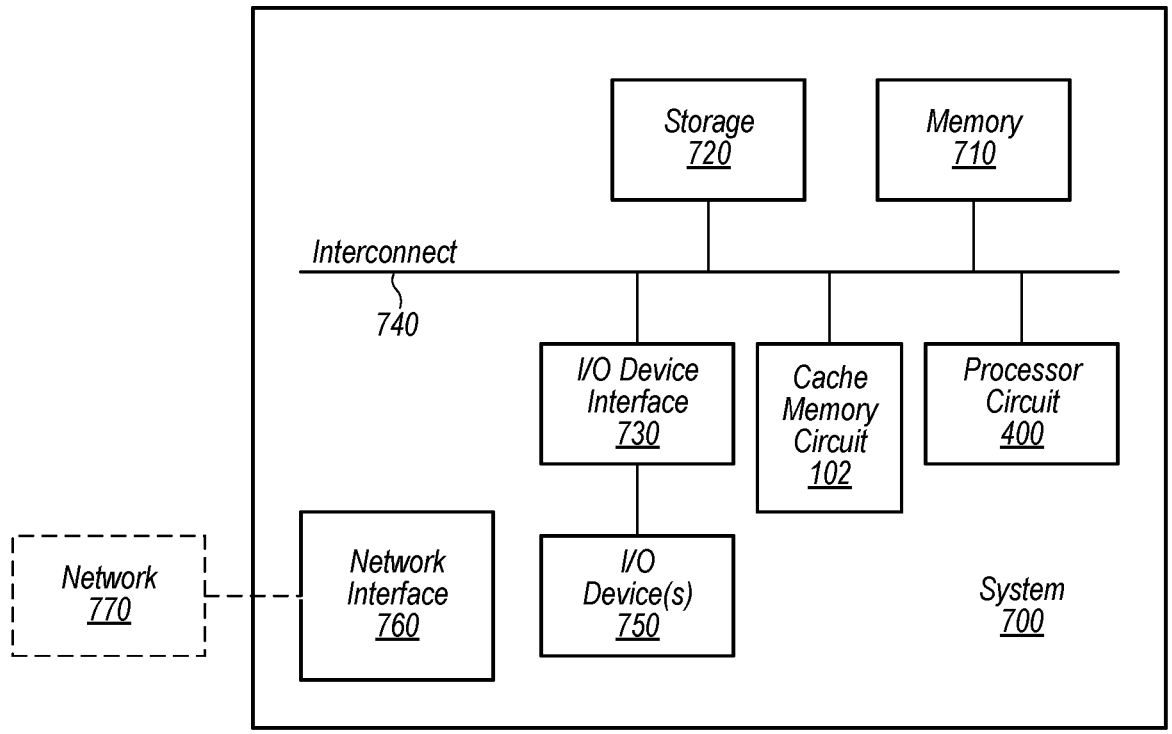
FIG. 7 is a block diagram of one embodiment of a computing device.

Processor circuit 400 and cache memory circuit 102 may be included within a variety of system configurations, one example of which is shown in FIG. 7. In various embodiments, system 700 may correspond to a general-purpose computer system such as a desktop or portable computer, a mobile phone, or the like. System 700 may also correspond to any type of embedded system that may employ one or more instances of processor circuit 400 as a dedicated controller. For example, system 700 may correspond to any type of computer peripheral device such as a mass storage device or storage array, printer, or the like, as well as control systems for automobiles, aviation, manufacturing, and other suitable applications.

As shown, system 700 includes processor circuit 400, memory 710, storage 720, cache memory circuit 102, and an input/output (I/O) device interface 730 coupled via an interconnect 740. One or more I/O devices 750 are coupled via I/O device interface 730. System 700 also includes network interface 760 that may be configured to couple system 700 to network 770 for communications with, e.g., other systems. In various embodiments, network interface 760 may be coupled to interconnect 740 directly, via I/O device interface 730, or according to a different configuration. It is noted that some or all of the components of system 700 may be fabricated as a system-on-a-chip, although discrete combinations of components may also be employed.

Processor circuit 400 may include a cache memory circuit as disclosed above. Memory 710 may include random-access memory (RAM) of any suitable organization configured to store data and instructions usable by processor circuit 400. Storage 720 may include mass storage devices such as magnetic, optical, or nonvolatile/flash memory storage, or any combination of these. In some embodiments, either memory 710 or storage 720 may be omitted or integrated into the other as a single memory subsystem from the perspective of processor circuit 400.

I/O device interface 730 may be configured to interface between interconnect 740 and one or more other types of buses or interfaces. For example, interconnect 740 may correspond to the advanced high-bandwidth bus ("AHB") interface or another suitable type of high-bandwidth interconnect, and I/O device interface 730 may be configured as a bridge device that enables coupling of different types of I/O devices to interconnect 740. I/O device interface 730 may implement one or more interface protocols such as Universal Serial Bus, Firewire, or other suitable standards. I/O device(s) 750 may include any suitable type of storage, network interface, user interface, graphics processing, or other type of device. Network 770, if present, may be any suitable type of wired or wireless communications network, such as an Internet Protocol (IP) addressed local or wide-area network, a telecommunications network, or the like. Network interface 760, if present, may be configured to implement any suitable network interface protocol needed for communication with network 770.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit, and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements are defined by the functions or operations that they are configured to implement. The arrangement of such circuits/units/components, with respect to each other and the manner in which they interact, form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements that may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in a scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a plurality of first-level cache memory circuits configured to store respective pluralities of cache lines;
a second-level cache memory circuit configured to:
send a plurality of probe requests regarding a particular cache line to the plurality of first-level cache memory circuits in response to receiving an acquire request for the particular cache line from a particular first-level cache memory circuit of the plurality of first-level cache memory circuits;
in response to a determination that a different first-level cache memory circuit of the plurality of first-level cache memory circuits is evicting a local copy of the particular cache line: receive the local copy of the particular cache line from the different first-level cache memory circuit,
write the local copy of the particular cache line to a higher-level memory circuit; and send a prefetch request for a new copy of the particular cache line to the higher-level memory circuit while the different first-level cache memory circuit responds to a corresponding one of the plurality of probe requests, wherein the second-level cache memory circuit includes a control circuit, and a plurality of banks, wherein the control circuit is configured to select a particular bank of the plurality of banks, wherein the particular bank includes an input queue circuit and a plurality of pipeline stages configured to perform corresponding operations, and wherein the second-level cache memory circuit is further configured to transfer the acquire request from the input queue circuit to an initial pipeline stage of the plurality of pipeline stages based on a length of time since the acquire request was received.

2. The apparatus of claim 1, wherein the second-level cache memory circuit is further configured to relay the new copy of the particular cache line to the particular first-level cache memory circuit in response to the acquire request.

3. The apparatus of claim 1, wherein a given first-level cache memory circuit of the plurality of first-level cache memory circuits is configured, in response to receiving a corresponding one of the plurality of probe requests, to:
in response to a determination that a copy of the particular cache line is being stored in the given first-level cache memory circuit, invalidate the copy of the particular cache line; and
in response to a determination that the copy of the particular cache line has been updated since it was originally stored in given first-level cache memory circuit, send the copy of the particular cache line to the second-level cache memory circuit.

4. The apparatus of claim 1, wherein the control circuit is configured to route the acquire request to the particular bank.

5. The apparatus of claim 1, wherein the plurality of first-level cache memory circuits includes a plurality of L2 cache memory circuits, and wherein the second-level cache memory circuit includes a L3 cache memory circuit.

6. A method, comprising:
sending, by a second-level cache memory circuit, a plurality of probe requests regarding a particular cache line to a plurality of first-level cache memory circuits in response to receiving an acquire request for the particular cache line from a particular first-level cache memory circuit of plurality of first-level cache memory circuits;
in response to determining that a different first-level cache memory circuit of the plurality of first-level cache memory circuits is evicting a local copy of the particular cache line:
receiving the local copy of the particular cache line from the different first-level cache memory circuit,
writing the local copy of the particular cache line to a higher-level memory circuit;
sending a prefetch request for a new copy of the particular cache line to the higher-level memory circuit while the different first-level cache memory circuit responds to a corresponding one of the plurality of probe requests;
selecting, by a control circuit included in the second-level cache memory circuit, a particular bank of a plurality of banks included in the second-level cache memory circuit; and
transferring, by the particular bank, the acquire request from an input queue circuit to an initial pipeline stage of a plurality of pipeline stages included in the particular bank based on a length of time since the acquire request was received.

7. The method of claim 6, further comprising relaying, by the second-level cache memory circuit, the new copy of the particular cache line to the particular first-level cache memory circuit in response to the acquire request.

8. The method of claim 6, further comprising, in response to determining, by a given first-level cache memory circuit of the plurality of first-level cache memory circuits, that a copy of the particular cache line is being stored in the given first-level cache memory circuit, invalidating the copy of the particular cache line in response to receiving a given one of the plurality of probe requests.

9. The method of claim 6, further comprising, in response to determining by a given first-level cache memory circuit of the plurality of first-level cache memory circuits, that a copy of the particular cache line being stored in the given first-level cache memory circuit has been updated since it was originally stored in the given first-level cache memory circuit, sending the copy of the particular cache line to the second-level cache memory circuit.

10. The method of claim 6, further comprising:
routing the acquire request to the particular bank.

11. The method of claim 6, wherein the acquire request includes a write request for the particular cache line.

12. An apparatus, comprising:
a plurality of bank circuits including a first bank circuit that includes a first input queue circuit, a plurality of first pipeline stages, and a first storage circuit,
a control circuit configured to:
receive a plurality of requests from a plurality of lower-level cache memory circuits;
select the first bank circuit; and
store a first request of the plurality of requests in the first input queue circuit; and wherein the first input queue circuit is configured to transfer the first request to a first initial pipeline stage of the plurality of first pipeline stages based on a first duration since the first request was received.

13. The apparatus of claim 12, wherein the plurality of bank circuits further includes a second bank circuit that includes a second input queue, a plurality of second pipeline stages, and a second storage circuit, wherein the control circuit is further configured to:
  select the second bank circuit; and
  store a second request of the plurality of requests in the second input queue; and
wherein the second input queue is configured to transfer the second request to a second initial pipeline stage of the plurality of second pipeline stages based on a second duration since the second request was received.

14. The apparatus of claim 12, wherein the first request includes an acquire request for a particular cache line.

15. The apparatus of claim 14, wherein the first storage circuit is configured to store a plurality of cache lines, and wherein the plurality of first pipeline stages are configured to process the first request to generate a plurality of probe requests for the plurality of lower-level cache memory circuits.

16. The apparatus of claim 12, wherein a different pipeline stage of the plurality of first pipeline stages includes at least one tag array circuit, and the different pipeline stage is retrieve a particular tag from the at least one tag array circuit using the first request.

17. The apparatus of claim 16, wherein another pipeline stage of the plurality of first pipeline stages is configured to access the first storage circuit using the first request and the particular tag.

18. The apparatus of claim 12, wherein the plurality of first pipeline stages includes a memory controller circuit configured to receive information from a higher-level memory circuit.

* * * * *